United States Patent
Thurfjell

(10) Patent No.: US 9,143,217 B2
(45) Date of Patent: Sep. 22, 2015

(54) METHOD AND ARRANGEMENT FOR SUPPORTING ADJUSTMENT OF TRANSMISSION FROM CORRELATED ANTENNAS

(75) Inventor: Magnus Thurfjell, Lulea (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/376,064

(22) PCT Filed: Feb. 8, 2012

(86) PCT No.: PCT/SE2012/050120
§ 371 (c)(1),
(2), (4) Date: Jul. 31, 2014

(87) PCT Pub. No.: WO2013/119152
PCT Pub. Date: Aug. 15, 2013

(65) Prior Publication Data
US 2015/0215023 A1  Jul. 30, 2015

(51) Int. Cl.
H04L 27/00 (2006.01)
H04B 7/06 (2006.01)
H04L 25/03 (2006.01)

(52) U.S. Cl.
CPC ............ H04B 7/0639 (2013.01); H04B 7/0617 (2013.01); H04L 25/03898 (2013.01)

(58) Field of Classification Search
CPC ... H04L 1/0003; H04L 1/0071; H04L 5/0007; H04L 1/0618; H04L 1/06; H04B 7/0669; H04B 7/0417
See application file for complete search history.

(56) References Cited

U.S. PATENT DOCUMENTS

| | | |
|---|---|---|
| 2008/0051150 A1 | 2/2008 | Tsutsui |
| 2010/0120460 A1 | 5/2010 | Karlsson et al. |
| 2014/0198682 A1* | 7/2014 | Ko et al. .................. 370/252 |
| 2014/0219162 A1* | 8/2014 | Eyuboglu et al. ............ 370/315 |

FOREIGN PATENT DOCUMENTS

WO  WO 2010/087749  8/2010

* cited by examiner

Primary Examiner — Ted Wang
(74) Attorney, Agent, or Firm — Baker Botts, LLP

(57) ABSTRACT

Method and arrangement for determining at least one phase affecting error related to transmission from at least one pair of correlated antennas. The method involves transmitting (1002) reference signals from the correlated antennas in the at least one pair, in a set of frequency bands, wherein a number of controlled phase differences are introduced between reference signals transmitted from the antennas. The method further involves receiving (1004), in response to the transmitted reference signals, for a number of the controlled phase differences, one or more indications of a selected precoder matrix. Further, the method involves identifying (1006) changes of selected precoder matrix over the number of controlled phase differences, over the set of frequency bands, wherein the identifying is based on the received one or more indications; and determining (1008) at least one relation between the identified changes. Further, at least one phase affecting error is determined based on said at least one relation. The method and arrangement enable adjustment of transmission from the at least one pair of correlated antennas, such that said at least one phase affecting error is reduced.

18 Claims, 11 Drawing Sheets

Ant:

1

2

METHOD AND ARRANGEMENT FOR SUPPORTING ADJUSTMENT OF TRANSMISSION FROM CORRELATED ANTENNAS

PRIORITY

This nonprovisional application is a U.S. National Stage Filing under 35 U.S.C. §371 of International Patent Application Serial No. PCT/SE2012/050120, filed Feb. 8, 2012 and entitled "Method and Arrangement for Supporting Adjustment of Transmission from Correlated Antennas."

TECHNICAL FIELD

The invention relates generally to adjustment of transmission from correlated antennas, and in particular to a method and arrangement for supporting the same by determining phase affecting errors.

BACKGROUND

In today's cellular systems the use of multiple antennas (e.g. MIMO) for transmission is becoming increasingly important. An antenna configuration or system can be designed with either correlated or uncorrelated antenna elements, or combinations thereof where some antenna elements are correlated and others uncorrelated.

To fully be able to exploit the potential of these multiple antenna systems the transmission from correlated antenna elements need to be aligned in phase. Such alignment may be referred to as antenna calibration. Antenna calibration is mostly important when an antenna configuration includes correlated antenna elements and for features that require well directed beams and when wideband precoding is preferred.

An example of an antenna configuration comprising correlated antenna elements is the correlated cross-pole, depicted in FIG. 1. The correlated cross-pole is one of the most attractive four-antenna eNB setups for LTE. The advantages of the correlated cross-pole stem mainly from the possibility of combining beam forming with dual-layer transmissions and a small physical form factor. The cross-polarized elements, or cross-poles, 102 and 104, illustrated in FIG. 1, each comprises two mutually uncorrelated cross-polarized antenna elements, 1+3 (102) and 2+4 (104), respectively. The antenna elements 1 and 2 are illustrated as dashed lines, and the antenna elements 3 and 4 are illustrated as solid lines in FIG. 1. The antenna elements, 1 and 2 (dashed line) have the same polarization and compose a first pair, A, of correlated antennas. The antennas, 3 and 4 (solid line) have the same polarization and compose a second pair, B, of correlated antennas.

Correlated antenna pairs have beam forming properties with beam directions dependent on the phase difference between transmissions from the antenna elements. For a single pair of correlated antennas, such as e.g. antenna 1 and 2 (pair A in FIG. 1), the main lobe or beam during transmission is pointing in the direction where the phases of the antenna signals are added constructively. By changing the phase of the signal emitted e.g. from one of the antennas in the pair, the main lobe direction will change.

One source of error in systems using correlated antenna pairs is timing differences between antenna branches. Such timing differences may be due e.g. to feeder length differences or delay differences in the radio chains. This type of error will henceforth be referred to as a delay error.

A delay error between the transmissions from correlated antennas in a pair, will result in a frequency dependent phase error, which in turn causes a frequency dependent beam direction. The frequency dependency could be expressed as $\Delta\phi = -2\pi\Delta f\tau$, where $\tau$ is the delay or timing difference between transmissions from the correlated elements. This is generally harmful for performance and becomes more critical with increased transmission bandwidth.

An example illustrated in FIG. 2 shows the variations of the received power of a transmission over a pair of correlated antennas in a certain direction, over a bandwidth of 20 MHz, with a timing difference of 65 ns between the correlated antennas. Another illustration can be seen in FIGS. 3a-b, where it is shown that a UE 302 located at a fixed position may experience constructive addition of the signals (i.e. being in the main lobe) in one part of the frequency band, and experience destructive addition, e.g. a null, in another part of the frequency band. Two antenna pairs, such as A and B illustrated in FIG. 1 may in general have independent delay errors.

Also some aspects of the phase errors themselves, even when they are not frequency dependent, or if a sufficiently small bandwidth is considered, need to be corrected. Such absolute phase errors change the beam direction. An error related to the absolute phase of an antenna element is here referred to as a "absolute phase error". Such absolute phase errors may be a problem if the precoder choices are limited or if, as in FIG. 1, there are two correlated pairs and the precoders are designed for specific relations between the two beams. Consider one of the correlated pairs in FIG. 1, e.g. antenna pair A. If there is no delay error between the elements of pair A, the beam direction will be defined by the absolute phase error difference between the antennas and will not be frequency dependent (which, as previously mentioned, is the case for delay errors).

For transmission to a single receiver, the beams of antenna pairs A and B should preferably be aligned, i.e. have their maximum beam-forming gain in the same direction. This put requirements on the difference between the absolute phase error differences between pair A and B i.e. $P_d = (P_4 - P_3) - (P_2 - P_1)$, where $P_x$=absolute phase error on antenna element x. The difference in absolute phase difference between two pairs of antennas, $P_d$, is commonly referred to as a "phase error difference", and will also be referred to as such henceforth in this description.

Other phase and delay errors may occur between the 4 antennas illustrated in FIG. 1. However, the described phase error difference (1 value) and timing errors (2 values) described above are the most important regarding system performance impact with the antenna configuration according to FIG. 1.

Solutions within a transmitter for estimating phase affecting errors, such as the delay and phase error difference described above, often require extra hardware, e.g. dedicated for calibration purpose only, which is expensive and inefficient.

SUMMARY

It would be desirable to have an efficient method for determining phase affecting errors, such as delay errors and phase errors, related to transmission from correlated antennas. It is an object of the invention to enable efficient determining of phase affecting errors.

According to a first aspect, a method is provided in a transmitting node in a wireless communication system. The method is suitable for determining at least one phase affecting error related to transmission from at least one pair of correlated antennas, which comprises a first and a second antenna. The method comprises transmitting reference signals from the correlated first and second antennas in the at least one pair, in a set of frequency bands. A number of controlled phase differences are introduced between reference signals transmitted from the first antenna in relation to reference signals transmitted from the second antenna. The method further comprises receiving one or more indications of a selected precoder matrix from another entity. The one or more indications are received in response to the transmitted reference signals, for a number of the controlled phase differences. The method further comprises identifying changes of selected precoder matrix over the number of controlled phase differences, over the set of frequency bands. The identifying is based on the received one or more indications. Further, the method comprises determining at least one relation between the identified changes of selected precoder matrix over the number of controlled phase differences and set of frequency bands; and further, determining at least one phase affecting error associated with the transmission from the at least one pair of correlated antennas based on said at least one relation.

According to a second aspect, an arrangement is provided in a transmitting node in a wireless communication system. The arrangement is suitable for determining at least one phase affecting error related to transmission from at least one pair of correlated antennas comprising a first and a second antenna. The arrangement comprises a transmitter, which is adapted to transmit reference signals from the correlated first and second antennas in the at least one pair, in a set of frequency bands, wherein a number of controlled phase differences are introduced between reference signals transmitted from the first antenna in relation to reference signals transmitted from the second antenna. The arrangement further comprises a receiver, which is adapted to receive one or more indications of a selected precoder matrix from another entity. The one or more indications are received in response to the transmitted reference signals, for a number of the controlled phase differences. The arrangement further comprises a functional unit adapted to identify changes of selected precoder matrix over the controlled number of phase differences, over the set of frequency bands. The identifying is based on the received one or more indications. The arrangement further comprises a functional unit adapted to determine at least one relation between the identified changes of selected precoder matrix over the number of controlled phase differences and set of frequency bands; and further adapted to determine at least one phase affecting error associated with the transmission from the at least one pair of correlated antennas based on said at least one relation.

The above method and arrangement enable adjustment of transmission from the at least one pair of correlated antennas, such that said at least one phase affecting error is reduced. Further both delay errors and phase error differences could be determined in an efficient manner. The method and arrangement offers a solution which is direction independent and the determining of phase affecting errors could therefore preferably be based on reports from one single receiver, e.g. one UE. Both the magnitude and the sign of a phase error difference may be directly found by using the solution described herein. The accuracy and speed of the error estimation is not dependent on the error values or combination of error values. The most important phase and delay errors $D_A$, $D_B$ and $P_d$ may be found from the same set of measurements. All of the above are great advantages and very useful in antenna calibration.

The above method and arrangement may be implemented in different embodiments. The determined relation may involve one a displacement of the identified changes of selected precoder matrix over the number of controlled phase differences between frequency bands, e.g. an average of the same. The determined relation may be the difference in absolute phase difference, within a frequency band, between the identified changes in selected precoder matrix for two pairs of correlated antennas, for a corresponding (2-antenna) precoder matrix The determined phase affecting error(s) may be a delay error between transmissions from the antennas in a pair of correlated antennas, and/or a phase error difference between transmissions from two pairs of correlated antennas. Further, the transmission from the at least one pair of correlated antennas may be adjusted based on the determined phase affecting error(s).

The embodiments above have mainly been described in terms of a method. However, the description above is also intended to embrace embodiments of the arrangement, adapted to enable the performance of the above described features. The different features of the exemplary embodiments above may be combined in different ways according to need, requirements or preference.

BRIEF DESCRIPTION OF THE DRAWINGS

The invention will now be described in more detail by means of exemplifying embodiments and with reference to the accompanying drawings, in which.

DETAILED DESCRIPTION

Figure 1:
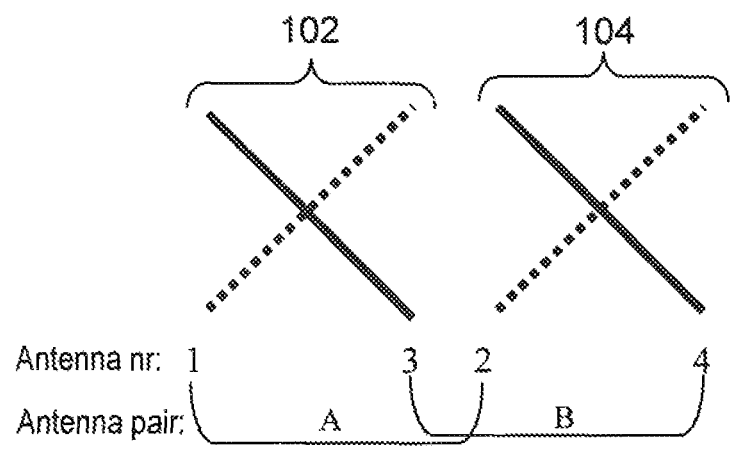
FIG. 1 shows a 4TX correlated cross-polarized antenna setup, according to the prior art.

The method and arrangement, or concept, described herein enable simultaneously estimating true values (including sign) of phase affecting errors, such as, e.g., of the three phase affecting errors $D_A$, $D_B$ and $P_d$, e.g. for a correlated cross pole as one illustrated in FIG. 1, where $D_A$ is a delay error between a first pair of correlated antennas, such as antennas 1 and 2 in FIG. 1.

$D_B$ is a delay error between a second pair of antennas such as antennas 3 and 4 in FIG. 1.

$P_d$ is the (possibly frequency dependent) phase error difference, i.e. the difference in absolute phase difference between the first and second pair of correlated antennas.

Briefly described, the concept described herein is based on collecting frequency selective PMI (Precoder Matrix Index) reports from a receiver while adding a phase rotation e.g. over time e.g. on a selected subset of the transmit antennas. The set of the PMI values available for reporting should be constructed to make the selection for each correlated pair independent of the choice for the other.

Within this description, the terms "precoder" and "precoder matrix" will be used interchangeably as synonyms.

Figure 4A:
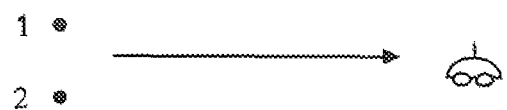
FIG. 4a shows a receiver UE direction relative a transmit antenna orientation.

First consider just a single pair of correlated and fully calibrated transmit antennas and a receiver in the direction shown in FIG. 4a.

Assume two rank1 precoders, e.g.:
1. $[1\ 1]^T$—representing 0 degrees phase difference between antenna 1 & 2.
2. $[1\ -1]^T$—representing 180 degrees phase difference between antenna 1 & 2

A phase difference related to the properties of a precoder, as the ones exemplified above, will be referred to as a "precoder phase difference" in this description. Further, a precoder as the ones exemplified above may in this description be referred to as a 2-antenna precoder, also when constituting a part of e.g. a 4-antenna precoder, such as e.g.

Figure 2:
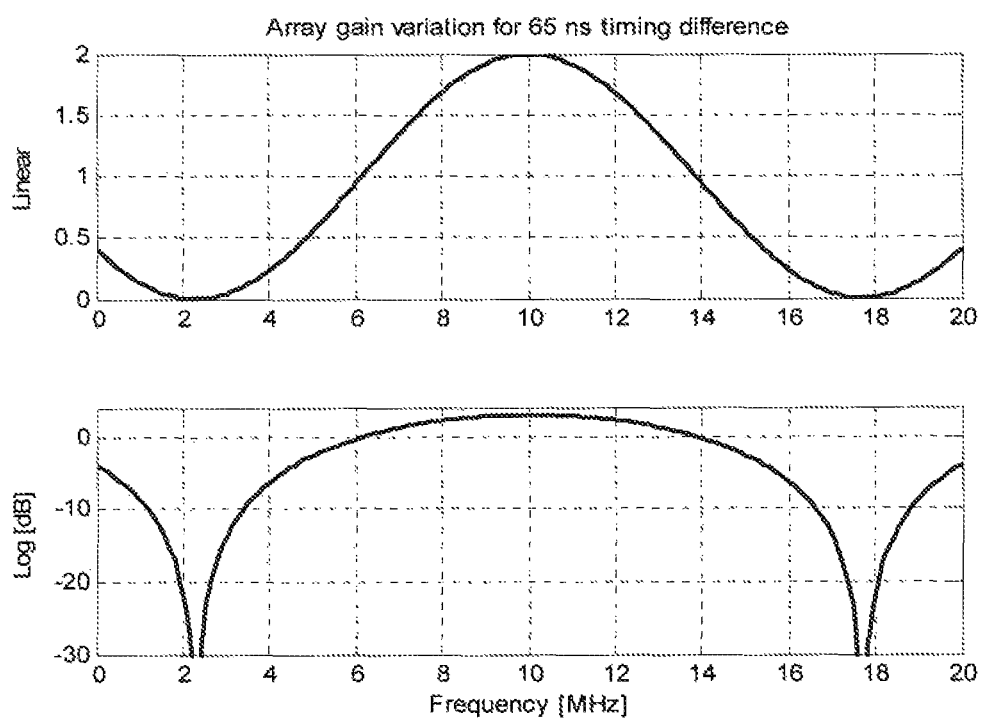
FIGS. 2 and 3a-3b shows examples of frequency dependent beam forming gain in the direction of a receiver.
Figure 3A:
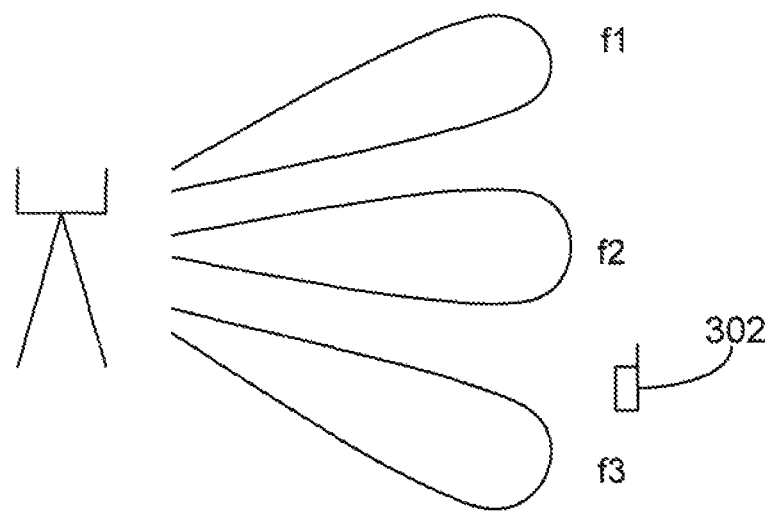
Figure 3B:
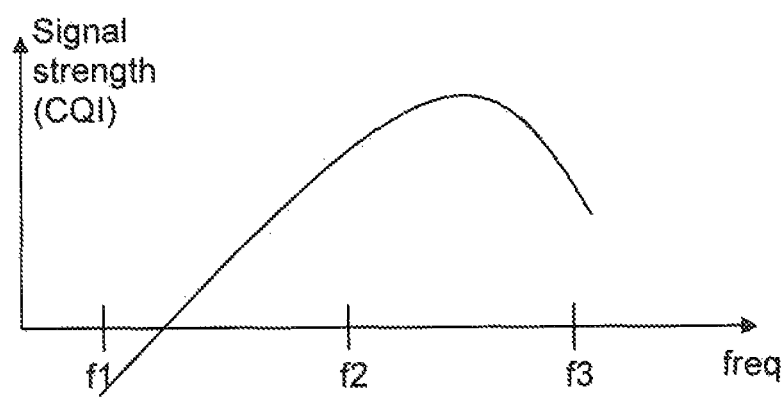

For the receiving UE in FIG. 2, precoder 1 will be preferred and selected, since it will produce a beam in the direction of the UE. Precoder 2, on the other hand, will make the signals from the antennas add destructively in the shown direction.

Now, introduce an additional phase difference between the correlated antennas, e.g. by adding an additional phase P on antenna 2, and vary the additional phase P controlled e.g. from 0 to 360 degrees, still considering the same UE direction. The beam forming gain in said UE direction will then vary as a function of P according to FIG. 4b. The diagram in FIG. 4b shows the beam forming gain in a narrow frequency band.

Figure 4B:
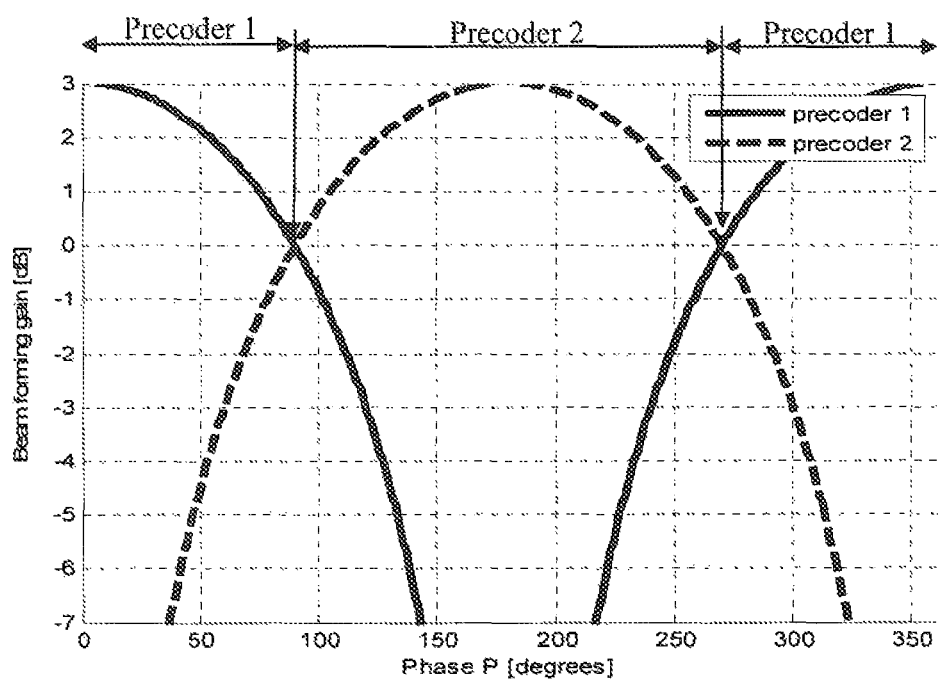
FIG. 4b shows a variation of beam forming gain and selected precoder in a direction from a pair of correlated transmit antennas as a function of an introduced phase difference P introduced between the antennas.

As can be seen from FIG. 4b, the preferred choice or selection (made by the UE) of precoder will vary with the added phase P, from precoder 1 for 0<P<90 deg.; precoder 2 for 90<P<270 deg., and finally precoder 1 again for 270<P<360 deg. The selection of precoder is made by the UE and signaled to the transmitting node e.g. as an indicated PMI. The selection of precoder is made by the UE from a set of precoders known to both the UE and the transmitting node. The selection is typically made from measurements on reference signals sent from the transmitting node without the use of any precoder from the set. That is, the reference signals are not precoded.

Figure 5:
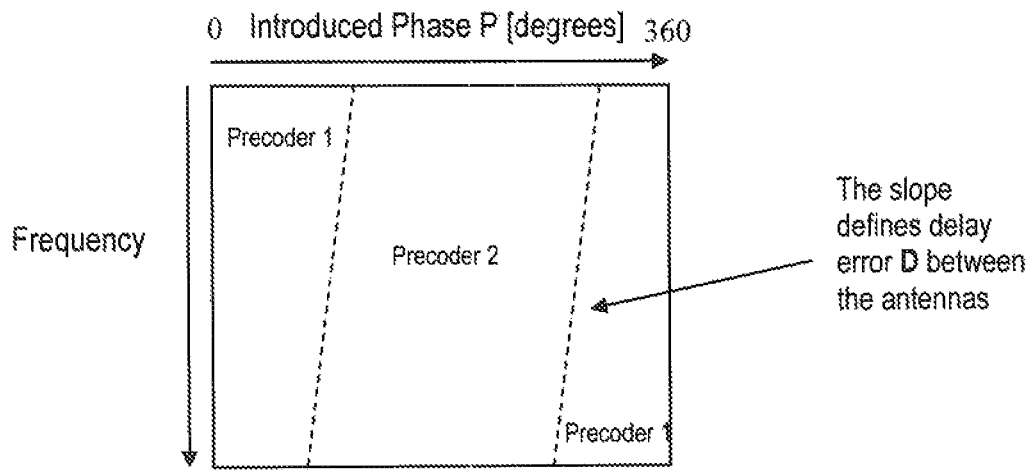
FIG. 5 shows a mapping of selected precoder for a pair of correlated antennas over an introduced phase difference P between the antennas, and over frequency, according to an exemplifying embodiment.

Now, introduce a delay error D between the antennas. FIG. 5 shows the selected precoder as a function of the varying phase P, which is an introduced phase difference between the antennas, and also as a function of the frequency.

A delay error is a linearly frequency dependent phase error The effect of the delay error may be seen in FIG. 5 as that the areas of selected (preferred) precoder shifts, or "moves", in relation to the controlled phase P, as the frequency changes. The dotted lines in FIG. 5 represent the borders between different selected (preferred) precoders. These borders have a slope, which, as realized by the applicant, is defined by the delay error D, which may be exploited.

Any additional non-frequency dependent phase error that is introduced between the antennas will only left- or right-shift (cyclic) the dotted lines representing the borders between different selected precoders in FIG. 5, but the slope will be unaffected.

Note that changing the direction to the receiving UE has the same effect (in practice) as the introduction of a non-frequency dependent phase error, as described above, due to changed propagation path length differences between the antennas.

The slope in FIG. 5 is therefore an estimate of the delay error D, and that estimate is independent of the direction from the transmitter to the receiving UE.

Now add another pair, B, of correlated antenna elements, uncorrelated to the first pair A, e.g. as in the configuration described in FIG. 1.

In a 4-antenna system the precoder set will handle four antennas. A 4-antenna precoder may be regarded as two combined 2-antenna precoders. The selection of a preferred (4-antenna) precoder of an entity reporting a preferred precoder to a transmitting node will then be the combination (of 2-antenna precoders) that is simultaneously preferable for both correlated pairs. This is in general not the same as the best (2-antenna) precoder for each pair.

Thus, in order to enable use of the above described method for two pairs of correlated antennas, the properties of the used precoder set should be controlled, such that the beam forming properties of the two pairs can be separated.

To make the precoder selections (beam forming choices) for the two antenna pairs independent of each other, the set of available 4-antenna precoders should include all combinations of the beam-forming alternatives of the separate antenna pairs.

As an example, the 2-antenna precoders shown above may be extended to a 4-antenna precoder set or book using all combinations of them:

|   | A |   | B |   |
|---|---|---|---|---|
| 1. | [1 | 1 | 1 | 1]$^T$ |
| 2. | [1 − 1 | 1 − 1]$^T$ | | |
| 3. | [1 | 1 | 1 − 1]$^T$ | |
| 4. | [1 − 1 | 1 | 1]$^T$ | | where the first two positions in each precoder matrix are related to antenna pair A, and the last two positions in each precoder matrix are related to antenna pair B. In this example the precoder phase difference between the antennas in each pair is either 0° or 180°. Even though this is an advantageous construction, other precoder phase differences are possible.

Figure 6:
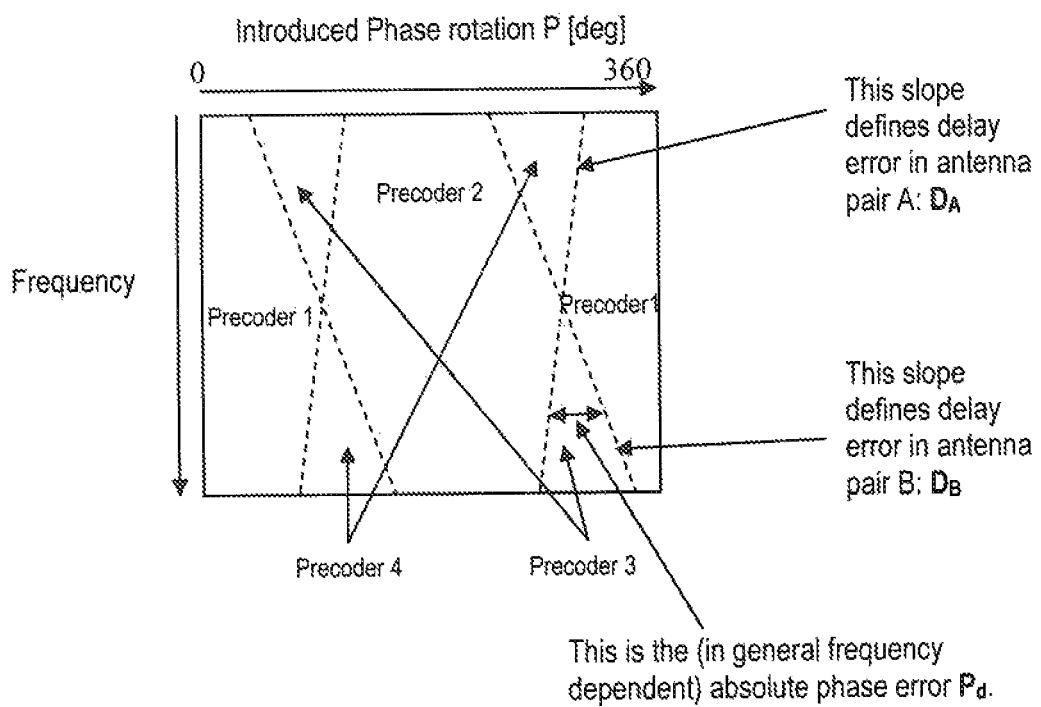
FIG. 6 shows a mapping of selected precoder for two pairs of correlated antennas over an introduced phase difference P between the antennas in each pair, and over frequency, according to an exemplifying embodiment.

Hence, independent of the selection for the first antenna pair A, all alternatives are available for the second antenna pair B, and vice versa. Now we can extend the diagram in FIG. 5 to include also antenna pair B, which is illustrated in FIG. 6.

The controlled phase P is now added to both antenna 2 and antenna 4, which are co-positioned but cross-polarized. The controlled phase P could alternatively be added to antennas 1 and 3, or divided between both antennas in each pair, such as to create the same phase difference between the two antennas. By analyzing the parts of each precoder related to each antenna pair separately, the delay errors for both antenna pairs can be found by analyzing and determining the relation, which is illustrated as slopes of the dotted lines in FIG. 6.

For antenna pair A, precoder 1 & 3 have the same beam forming properties ($[1\ 1]^T$) and precoder 2 & 4 together represent the other beam alternative ($[1\ -1]^T$) for pair A.

For antenna pair B, precoder 1 & 4 have the same beam forming properties ($[1\ 1]^T$) and precoder 2 & 3 together represent the other beam alternative ($[1\ -1]^T$).

In addition to this there is another property that can be extracted from a graphical representation as the one in FIG. 6, namely the difference in phase difference $P_d$ between the two antenna pairs, A and B.

In the example illustrated in FIG. 6, e.g. the two leftmost dotted lines represent the same (2-antenna) precoder matrix properties, or in other words, the same (equal) precoder phase difference, e.g. 0° or 180°, between the reference signals from each correlated pair seen from the receiver. The introduced controlled phase difference, or phase rotation value P that results in this precoder phase difference (i.e. a phase difference corresponding to the precoder matrix properties), can be viewed as compensating for any phase error and thus $P_d$ can be estimated as the difference in the compensating value P or distance between said lines, as illustrated in FIG. 6.

Any lines representing the same precoder phase difference (or shift) between the reference signals from each correlated pair seen from the receiver can be used for estimating $P_d$. In FIG. 6 there are two examples of this value. The two leftmost dotted lines represent a precoder phase difference of 90 degrees (a selected precoder right between $[1\ 1]^T$ and $[1\ -1]^T$) and the two rightmost dotted lines represent a precoder phase difference of 270 degrees (a selected precoder right between $[1\ -1]^T$ and $[1\ 1]^T$).

To summarize; both the delay values $D_A$ and $D_B$, as well as the fixed phase difference $P_d$ may be derived from a map or mapping, such as the one illustrated in FIG. 6, or corresponding representation.

As previously described, precoder reports from a receiving entity, such as a UE, are used in order to determine which precoder that is preferred or selected by the UE for each correlated antenna pair. In order to derive the frequency dependency of the preferred, selected precoder, i.e. how the selection of precoder changes over frequency, the UE may be configured to send "per sub-band" precoder reports, i.e. reports in which a preferred selected precoder is indicated for each of a number of frequency sub-bands.

Further, as described above, the phase dependency of the precoder selection is found by introducing a controlled phase difference between the correlated antennas. This may be accomplished e.g. by a controlled phase rotation on antenna 2 and 4 over time, e.g. by adding an extra phase shift per ms. The controlled changes of the phase may alternatively be performed in any order, and not necessarily in a consecutively increasing order, as described here. Further, a code multiplexing scheme may be used, where the phase differences or shifts are generated simultaneously, separated by a code. However, for the understanding of the concept described herein, it may be advantageous to regard the introduction of controlled phase differences between the antennas as a linear increase over time of said phase differences.

Typically, a UE, e.g. in an LTE-type system, may select a preferred precoder from a set of predefined precoders, which are designed for other purposes than the herein described. Thus, in order to perform the herein described concept, such a set of precoders from which the UE can select should be restricted such that all available beam directions for antenna pair A are combined with all available beam directions of antenna pair B, in the remaining set, as previously described. This, as previously mentioned, may be referred to as that the remaining set should be "symmetric".

Note that there might be multiple precoders resulting in the same beam forming properties, due to that precoders may have different polarizarion properties. Precoders having the same beam forming properties, although different polarizarion properties, may therefore be used together in groups, as will be illustrated below. Further, higher rank precoders with the same beam forming properties could also be included in the groups.

When having groups of precoders having the same beam forming properties, the selected precoder group could be identified or noted, e.g. in a table/map, rather than an individual selected precoder. The table/map could be composed e.g. as illustrated in FIG. 7, where each row represents a frequency sub-band and each column represents a step (of a number of steps between 0° and 360°) in a phase rotation.

Figure 7:
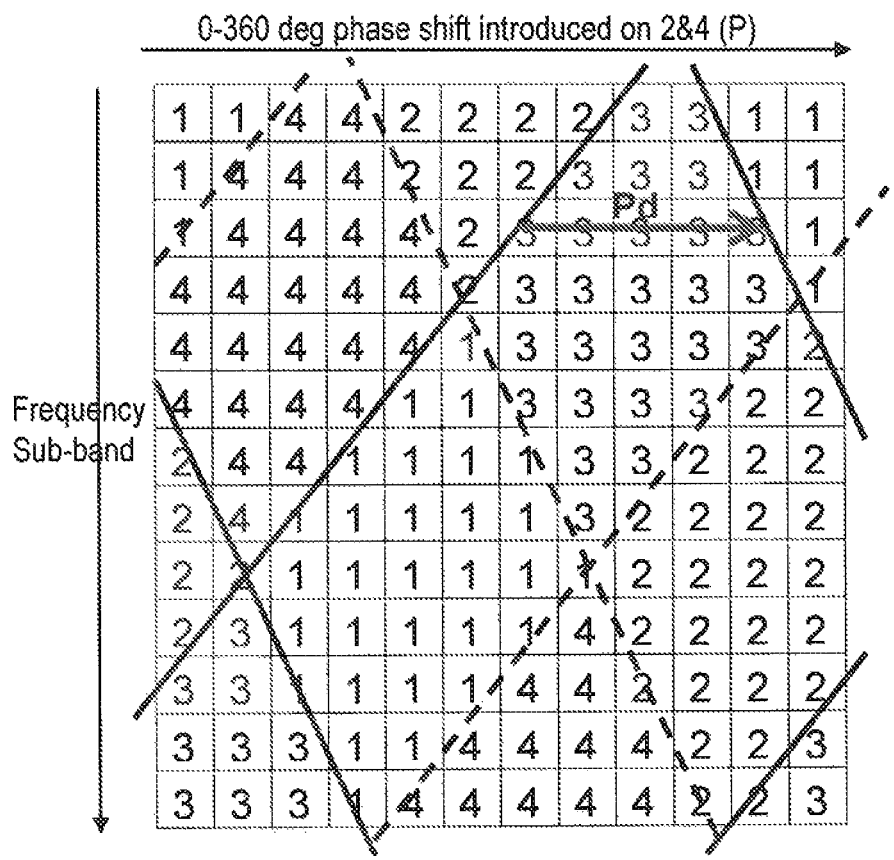
FIG. 7 shows an exemplifying map of PMI group selections, according to an exemplifying embodiment.

By analyzing, e.g. in FIG. 7, the borders between where, in the map, the different precoder groups have been reported to be selected by a UE, both one absolute phase error difference $P_d$ as well as two different delay errors $D_A$ and $D_B$ can be simultaneously extracted.

LTE Embodiment

For the 4-antenna configuration illustrated in FIG. 1, in LTE, 16 precoders are defined per rank. If the whole precoder set is used, the beam-forming properties will not be independent between the two antenna pairs as discussed above. Thus, the precoder set should be reduced to a symmetric subset of the LTE precoder book, which in fact is supported in the standard by the use of "codebook subset restriction".

Precoders control both polarization and beam-forming properties, and therefore there are multiple precoders having identical beam forming properties that differ in polarization properties, as previously described. The grouping below is based on a subset of the currently available 4-antenna precoders in LTE. Below, the codes comprised in the symmetric precoder set will be listed, and the phase differences within each antenna pair and the polarization differences will be indicated for the respective groups (CI=Codebook indication, RI: rank indication, V=Vertical polarization, H=Horizontal polarization):

PMI group 1: Beams are aligned: A—0 deg. B—0 dog
CI:0, RI:0 (Rank1, V)
CI:8, RI:0 (Rank1, H)
CI:8, RI:1 (Rank2, VH)

PMI group 2: Beams are misaligned: A—0 deg. B—180 deg
CI:12, RI:0 (Rank1, V)
CI:13, RI:0 (Rank1, H)
CI:13, RI:1 (Rank2, VH)

PMI group 3: Beams are aligned: A—180 deg. B—180 deg
CI:2, RI:0 (Rank1, V)
CI:10, RI:0 (Rank1, H)
CI:2, RI:1 (Rank2, VH)

PMI group 4: Beams are misaligned: A—180 deg. B—0 deg
CI:14, RI:0 (Rank1, V)
CI:15, RI:0 (Rank1, H)
CI:15, RI:1 (Rank2, VH)

If sub-band PMI reports indicating precoder matrices or groups from the restricted set defined by the PMI groups above are collected from a UE during a controlled phase rotation of e.g. 360 degrees, a map with the different PMI groups can be created, as the one illustrated in FIG. 7. In FIG. 7, the rows represent frequency sub-bands, and the columns represent different phase rotations.

From the slope of the borders between the different precoder selections, the timing errors $D_A$ and $D_B$ can be calculated.

The borders, or lines fitted to the borders, are also related in absolute terms, which make it possible to also find the differences of the phase (shift) differences $P_d$ between the correlated pairs.

Below, an exemplifying procedure for applying the concept described herein will be described in a general step-by-step manner. $t_x$ and $d_{xn}$ represent delay and phase error on antenna x on sub-band n:

1. Select a set (at least 2) of 2-antenna precoders representing different precoder phase differences (shifts), i.e. different beam directions for a correlated antenna pair.
2. Construct a symmetric set of 4-antenna precoders by using all combinations of the 2-antenna precoders.
3. Set a phase difference (shift) value P=0 degrees and a phase increase value $P_a=360/N$ where N is an integer>1
4. Divide the transmit bandwidth into S (at least 2) equally sized sub-bands with bandwidth $S_{BW}$
5. Construct two S×N matrices $M^A$ and $M^B$ with elements $m^A_{ij}$ and $m^B_{ij}$
6. Loop L=1:N
7. Transmit known reference signals from all transmit antennas
8. Let the receiver report the best precoding choice or selection W from the symmetric 4-antenna precoder set for each sub-band s.
9. For all sub-bands s let $m^A_{sL}=w_{21}/w_{11}$ and $m^B_{sL}=W_{41}/w_{31}$ 10. Add the phase P to two of the antennas at same position, e.g. antennas 2 and 4
11. Let P=P+Pa
12. Loop end
13. Construct a complex row vector V with elements $v_k$ $v_k=e^{i\cdot P\cdot k}, k=[0 \wedge N-1]$ 14. Estimate sub-band phase differences (shifts)

$Pest_A=-VM_A^H$ $Pest_B=-VM_B^H$

15. Analyze phase difference (shift) rate per sub-band using a discrete Fourier transform:

$PS_A=dft(Pest_A)$ $PS_B=dft(Pest_B)$

16. Estimate rate by finding index of maximum absolute value $Rind_A=ind(max(abs(PS_A)))$ $Rind_B=ind(max(abs(PS_B)))$ 17. Calculate phase error difference per sub-band $PD_A$, $PD_B$ $PD_A=e^{j2\pi(Rind_A-1)/S}$ $PD_B=e^{j2\pi(Rind_B-1)/S}$ 18. Calculate delay errors $D_A$ and $D_B$ $D_A=d_2-d_1=-arg(PD_A)/2\pi S_{BW}$ $D_B=d_4-d_3=-arg(PD_B)/2\pi S_{BW}$ 19. Calculate phase error difference per sub-band $P_{dn}$ $P_{An}=n\cdot PS_A(Rind_A)\cdot PD_A$ $P_{Bn}=n\cdot PS_B(Rind_B)\cdot PD_B$ $P_{dn}=(P_{4n}-P_{3n})-(P_{2n}-P_{1n})=arg(P_{Bn}/P_{An})$ where n=0 . . . (S−1) represents each sub-band Note that instead of the collecting of actual precoder indicators (PMI) in a single map, here, the results for the different introduced phase differences between the correlated pairs are collected in two separate maps, one for each antenna pair (step 9).

The reason is that it is practical for the subsequent calculations in step 14 where the actual phase references are calculated. $P_A$ and $P_B$ represent the estimated values per sub-band, of the phase rotation value P where the phase difference between the reference signals in each correlated pair, A and B have 0 degrees phase difference.

The sample with max absolute value from the DFT in step 15 and 16 is an estimation of how much the phase rotation value P, resulting in a phase difference of 0 degrees explained above, is changed per sub-band. That is, an estimation of the slope of the lines in e.g. FIG. 7. Step 17 and 18 converts the result to the corresponding delay error.

EXAMPLE

Figure 8:
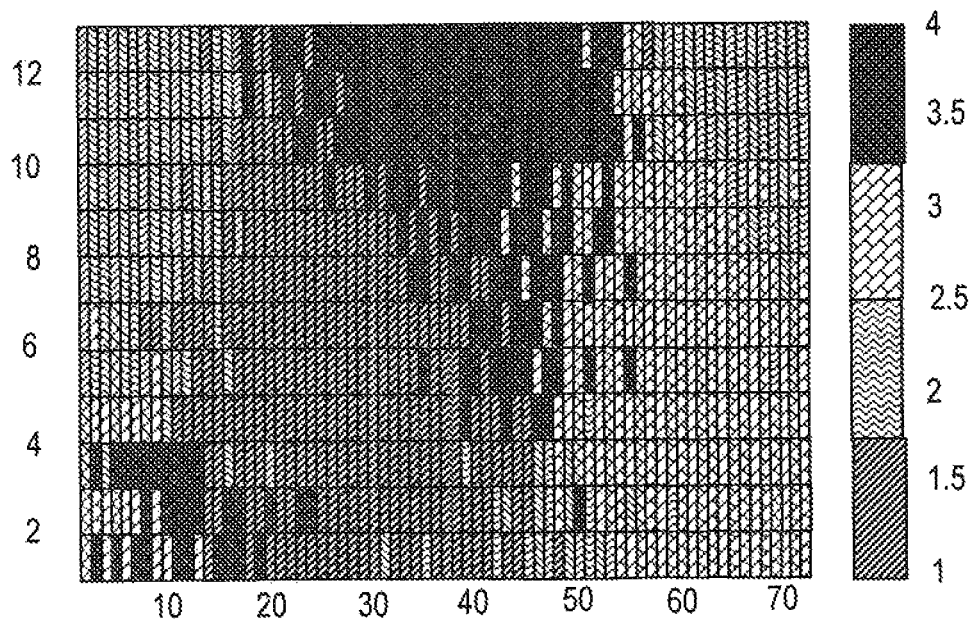
FIG. 8 shows an exemplifying map of PMI group selections from simulation, according to an exemplifying embodiment.

If we use FIG. 8 as an example and first estimate the pattern regarding antenna pair A.

For antenna pair A, precoder groups 1 and 2, illustrated by different patterns in FIG. 8, hold the same beam forming properties represented by a 0 degree phase difference between the two antenna elements.

Create a new map $M_A$ with the same size as the map in FIG. 8 and add complex values of magnitude 1 and phase 0 (i.e. the real number 1) at the positions where precoder groups 1 or 2 are chosen.

On the other positions, where precoder group 3 or 4 is chosen, add complex values with magnitude 1 and phase 180 deg. (i.e. the real number −1) corresponding to the phase difference between the antennas in pair A for groups 3 and 4.

The above selection of 1 and −1 in a new map is the procedure described in step 9 of the step-by-step description above. The division of the two complex precoder elements representing each correlated pair gives the phase difference, in this case 0 or 180 degrees.

The new map will then hold one of two values (1 or −1) in each of its elements. For each row of the new map the pattern of "1" and "−1" will be cyclic and the values will represent a phase rotation going from left to right. In this exemplifying case the phase is quantized in two values, 0 and 180 degrees.

Now, the task is to estimate the position with 0 degrees phase difference, i.e. the "middle" of the field with ones, which is representing a 0 degree phase difference (shift) between the received reference signals. One way to do this is to take the sum of each row weighted with a fixed phase rotation.

Let the values (1 and −1) of a row be denoted by $m_k$ where k is the column number and has a range from 1 to 72 in the example from FIG. 7. The fixed phase rotation is represented by the values $v_k$ where $$v_k = e^{i\cdot\frac{k-1}{72}} \quad k = [1 \wedge 72]$$

The position in the pattern where the phase difference (shift) is 0 is estimated by the phase of P where $m_k$ is row number s of matrix $M_A$;

$$P_s = \sum_k v_k m_{ks}$$

By now we have a complex value $P_s$ for each row. The phase differences of $P_s$ between rows indicate the left/right shift of the pattern and will be used to estimate the delay error. The absolute values of P is an indication on the estimation accuracy.

From these estimates $P_s$, one value per row, a slope should be estimated in order to get an indication of the delay error. The value that we are looking for is in fact the average phase shift (of the value change pattern) per sub-band of P and that is precisely what the Fourier transform, or DFT, of P gives us. Thus, the phase shift represented by the DFT output domain sample with the largest absolute value is an estimate of the delay error, steps 15-18, where e.g. $\text{Rind}_A$ is the index to the DFT output sample with the largest absolute value, $S_{BW}$ is the sub-band bandwidth and S is the number of sub-bands which in this case is the same as the DFT size. Note that the DFT size can be larger than the number of values in P (which is the number of sub-bands) by padding P with zeros before the DFT to increase granularity.

The same procedure is performed also for the other antenna pair B to estimate $D_B$.

For the estimation of the phase difference $P_d$, also the phase of the frequency domain sample $\text{Rind}_A$ is used. Comparing these phase values for the two antenna pairs will hold as an estimate of the absolute phase difference, step 19.

Where $P_{An}$ and $P_{Bn}$ is the phases of DFT sample number $\text{Rind}_A$ and $\text{Rind}_B$ of antenna pair A and B, respectively, and n is the sub-band number starting with 0 for the sub-band with lowest frequency.

Figure 9A:
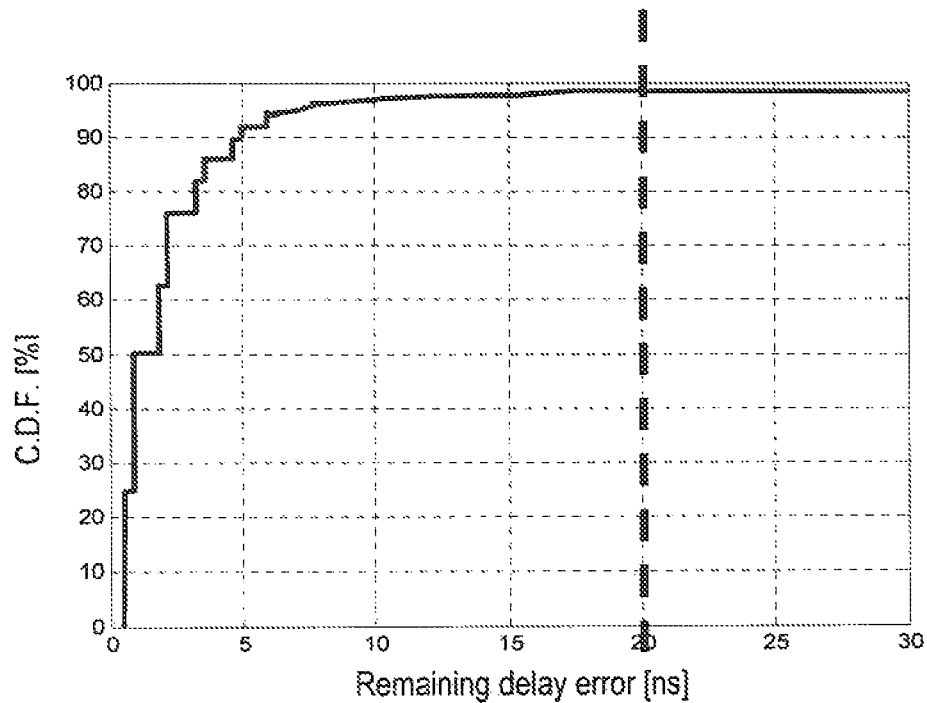
FIGS. 9a and 9b show simulation results of the calibration accuracy after 72 PMI reports per sub-band, according to an exemplifying embodiment.
Figure 9B:
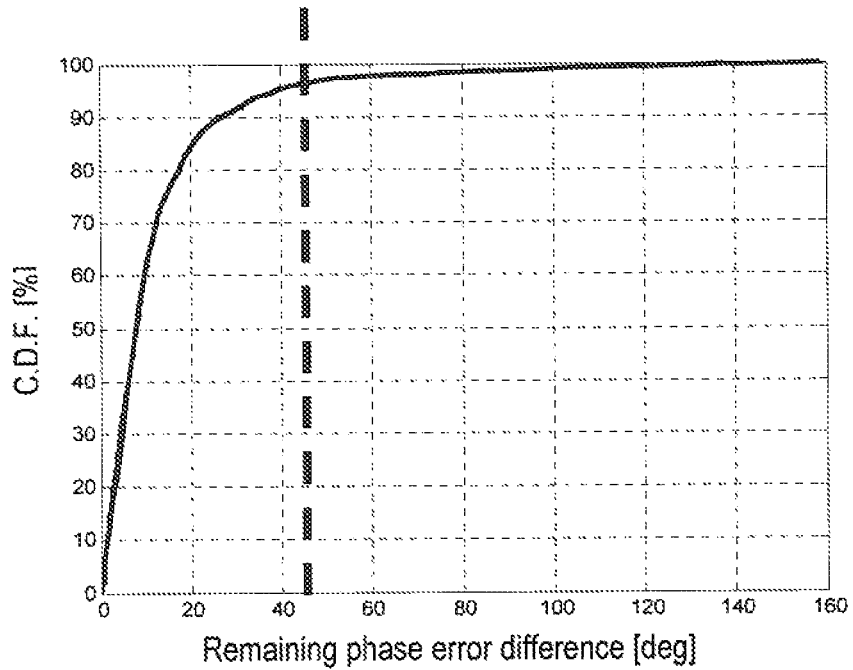

FIG. 9a and FIG. 9b show simulation results of the calibration accuracy after 72 received PMI reports per sub-band. The required accuracy is around 20 ns for $D_A$ and $D_B$ and around 45 degrees for $P_d$. The diagram in FIG. 9a could be read as that 98% of the randomly chosen UEs, that were used for the calibration procedure, were able to correct the delay error of the base station antennas to a value below 20 ns after 72 PMI reports. The diagram in FIG. 9b could be read as that 96% of the randomly chosen UEs, that were used for the calibration procedure, were able to correct the difference of the phase difference $P_d$ at the base station antennas to a value below 45°. The results appear to be relatively insensitive to the initial error combinations or absolute values.

Figure 10:
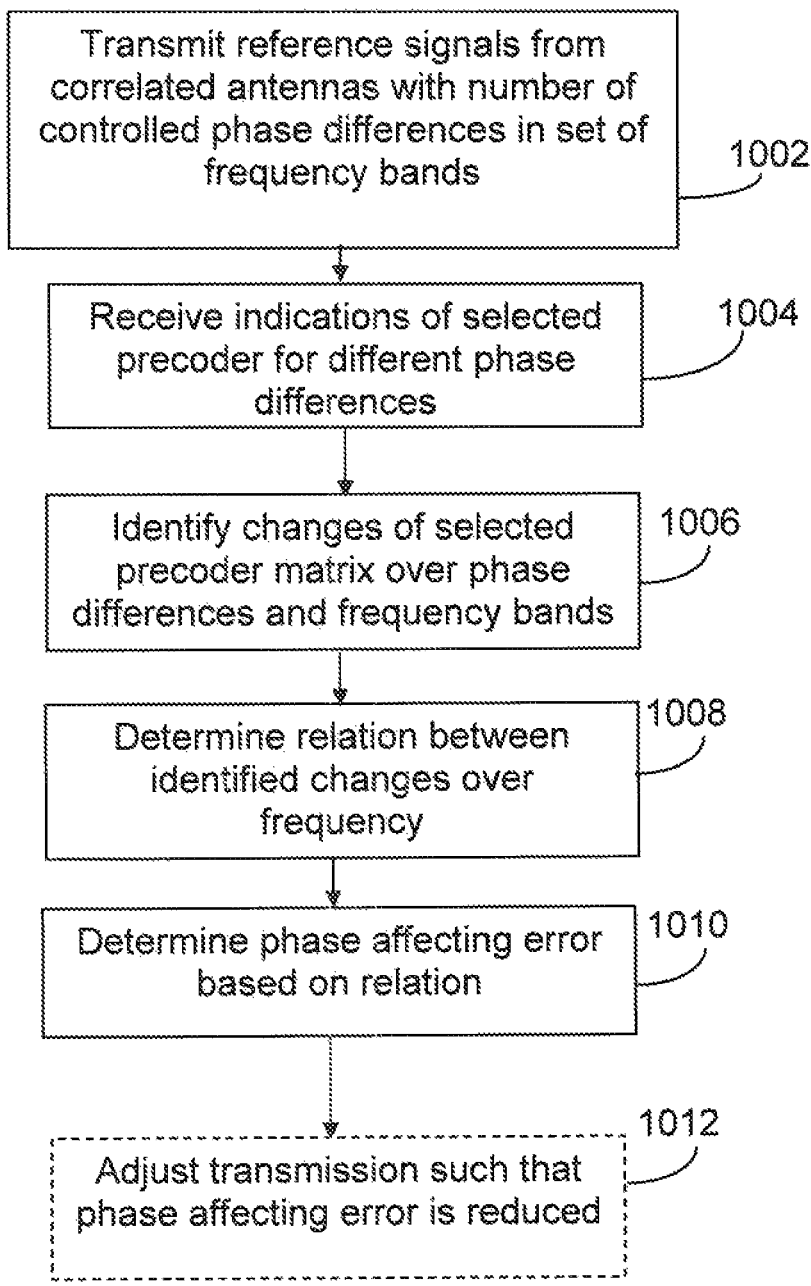
FIGS. 10-12 are flow charts illustrating procedures, according to exemplifying embodiments.
Figure 11:
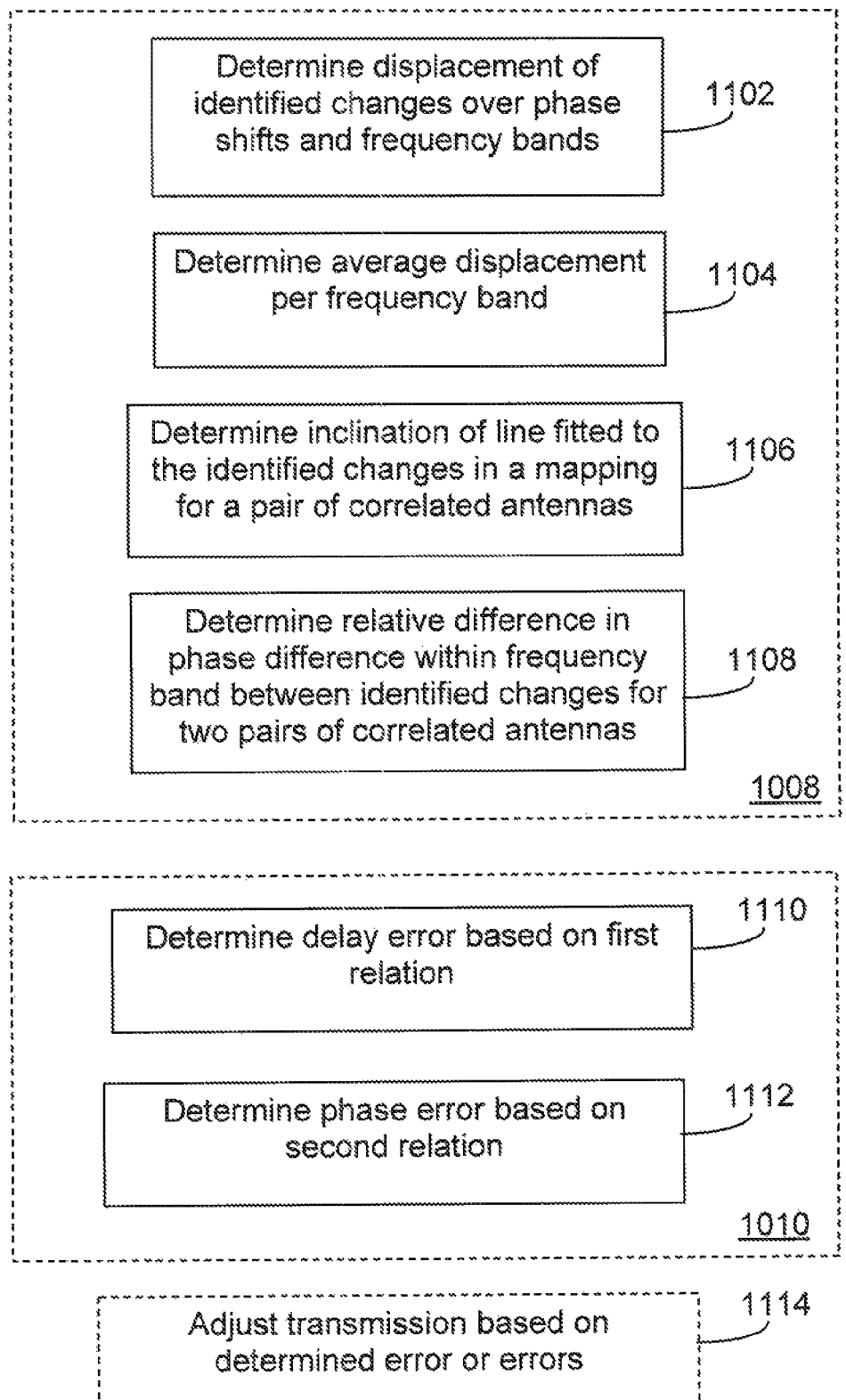
Figure 12:
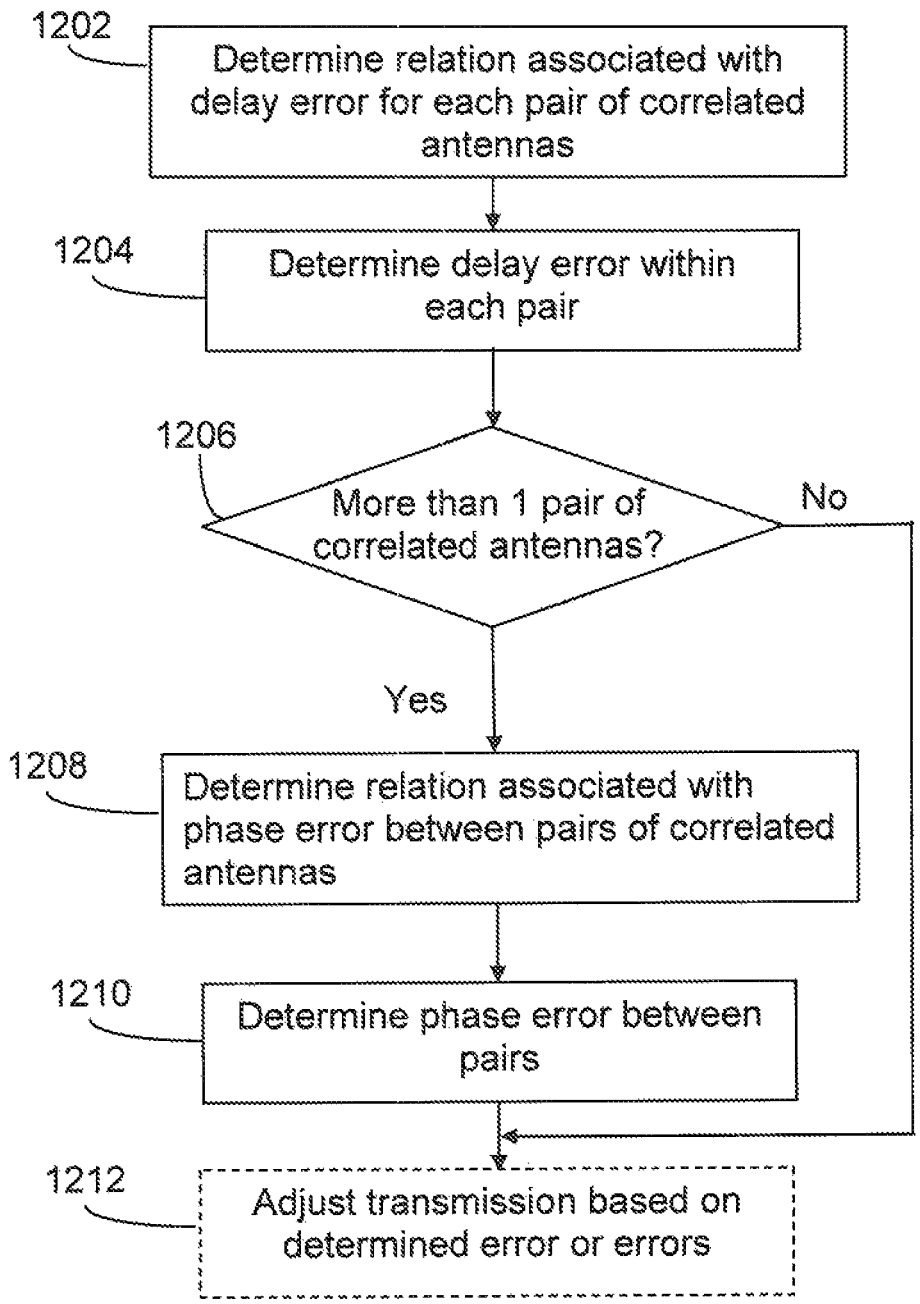

Exemplifying Procedures, FIGS. 10-12

Below, exemplifying embodiments of the procedure for determining at least one phase affecting error related to transmission from at least one pair of correlated antennas comprising a first and a second antenna will be described with reference to FIGS. 10-12. The procedure(s) could be performed in a network node which is associated with or directly controls the correlated antennas, i.e. a node that uses the correlated antennas for transmission, such as e.g. an RBS, such as an eNB, or similar. Alternatively, the procedure could be performed in a network node which is not associated with or directly controls the correlated antennas, i.e. a node which does not itself use the correlated antennas for transmission, such as e.g. an OAM (Operations, Administration & Maintenance) node.

Reference signals are transmitted from the correlated first and second antennas in the at least one pair, in one or more actions 1002. The reference signals are transmitted in a set of frequency bands and a number of controlled phase differences are introduced between the antennas of a pair. That is, a number of controlled phase differences, e.g. between 0° and 360° are introduced between reference signals transmitted from the first antenna in relation to reference signals transmitted from the second antenna.

Further, one or more indications of a selected precoder matrix are received, in one or more actions 1004, from another entity, such as a mobile terminal, in a direction from the antennas. The one or more indications are received in response to the transmitted reference signals, and relate to a number of the controlled phase differences. For example, one indication per controlled phase difference and frequency band could be received (cf. e.g. one indication per row for each column in FIGS. 7 and 8). Further, changes of selected precoder matrix are identified in one or more actions 1006, based on the one or more received indications. Changes between different controlled phase differences and over the set of frequency bands are identified. At least one relation between the identified changes is determined in an action 1008. Further, at least one phase affecting error associated with the transmission from the at least one pair of correlated antennas is determined in one or more actions 1010, based on the at least one determined relation. For example, the at least one phase affecting error could be a delay error between transmissions from the antennas in a pair, and/or a phase error difference between two pairs of correlated antennas. This enables adjustment of the transmission from the correlated antennas, such that the determined error or errors may be reduced, which may result in a number of advantages.

When the procedure is implemented in a network node which does not directly control the antennas, "transmitting" may refer e.g. to inducing or triggering transmission from the antennas, etc.

Depending e.g. which type of error that is to be estimated, different relations between the identified changes may be determined. Different possible procedure actions for determining the relations are illustrated in FIG. 11. For example, when a delay error is to be determined, the displacement, between frequency bands, of the identified changes may be determined e.g. in an action 1102 (c.f. how the border between selected precoders shifts between rows in FIGS. 7 and 8.) For example, the average displacement in phase difference (phase shift) per frequency band of the changes of selected precoder matrix may be determined e.g. in an action 1104. The term "displacement" refers to what in a graphical representation, e.g. FIG. 6 or 7, may be seen as a displacement or movement along the x-axis. Thus, "the average displacement in phase difference per frequency band" refers to what in a graphical representation, e.g. FIG. 6 or 7, may be seen as the slope of a line fitted to a border between different selected precoders. A relation may be determined, e.g. in an action 1106, as the inclination of a line fitted to the identified changes of selected precoder matrix in a map, such as a controlled phase difference vs. frequency band mapping, for a pair of correlated antennas.

When a phase error difference is to be determined, the difference in absolute phase difference, within a frequency band, between the identified changes in selected precoder matrix for two pairs of correlated antennas may be determined e.g. in an action 1108. This relation may be determined e.g. as the distance, in phase difference, between lines fitted to the identified changes of selected precoder for two pairs of correlated antennas in a map as the ones illustrated in FIGS. 7 and 8. The lines should be fitted to equal precoder properties for both antenna pairs, e.g. changes to or from a corresponding precoder matrix for both antenna pairs, i.e. a (2-antenna) precoder matrix having the same beam forming properties (phase shift), e.g. $[1\ 1]^T$.

When one or more relations have been determined, e.g. in one or more of the actions 1102-1108 illustrated in FIG. 11, one or more phase affecting errors may be determined. For example, a delay error between transmissions from the antennas in a pair of correlated antennas may be determined in an action 1110, based on a relation determined in one of actions 1102-1106. Further, a phase error may be determined in an action 1112, based on a relation determined in action 1108.

A phase error may be determined from a relation determined for only one frequency band. However, for determining a delay error, information related to at least two frequency bands is required.

A set of precoder matrices, from which the precoder matrix is selected, is preferably configured such that precoder matrix selections for different antenna pairs are made independent of each other.

FIG. 12 illustrates a procedure according to an exemplifying embodiment, wherein a relation associated with delay error is determined in an action 1202. When said relation is determined, a delay error is determined in an action 1204. If the procedure is performed for more than one pair of correlated antennas, a relation associated with phase error may be determined in an action 1208. A phase error between pairs of antennas may be determined in an action 1210, and the transmission may then be adjusted in an action 1212, based on the estimated delay error and/or phase error.

Figure 13:
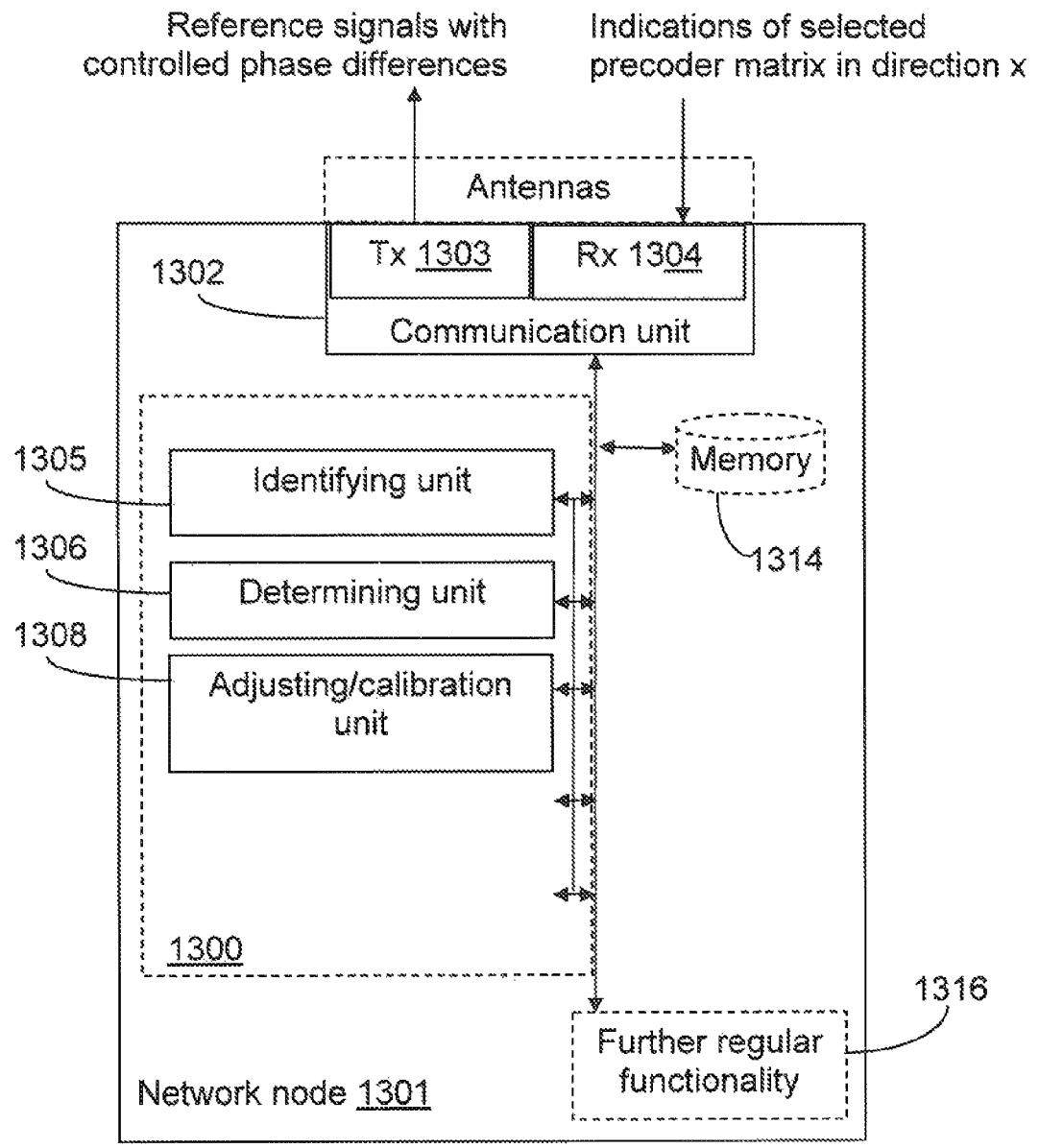
FIGS. 13 and 14 are block charts illustrating arrangements according to exemplifying embodiments.

Exemplifying Arrangement, FIG. 13

Below, an example arrangement 1300, adapted to enable the performance of the above described procedure(s) for determining at least one phase affecting error related to transmission from at least one pair of correlated antennas comprising a first and a second antenna will be described with reference to FIG. 13. The arrangement is suitable for use in a network node and is illustrated as being located in a network node 1301 in FIG. 13. The network node could be e.g. an eNB or similar, a mobile terminal, or an OAM node in a communication system. The arrangement 1300 is further illustrated as to communicate with other entities via a communication unit 1302 which may be regarded as part of the arrangement 1300. The arrangement or network node may further comprise other functional units 1316, such as e.g. functional units providing regular eNB or mobile terminal functions, and may further comprise one or more storage units 1314.

In a preferred embodiment, the arrangement is adapted for use in a transmitting network node, which directly controls the correlated antennas in question. The arrangement could alternatively be adapted for use in another node, which does not directly control the correlated antennas in question, as previously described. The actions of transmitting etc. from the antennas would then be performed by inducing or triggering a node controlling the antennas to perform said actions in an explicit or implicit manner.

The arrangement 1300 could be implemented e.g. by one or more of: a processor or a micro processor and adequate software and memory for storing thereof, a Programmable Logic Device (PLD) or other electronic component(s) or processing circuitry configured to perform the actions described above.

The arrangement comprises a transmitter 1303, adapted to transmit reference signals from the correlated first and second antennas in the at least one pair, in a set of frequency bands, wherein a number of controlled phase differences are introduced between reference signals transmitted from the first antenna in relation to reference signals transmitted from the second antenna. The arrangement further comprises a receiver 1304, adapted to receive, from another entity, such as a mobile terminal, in response to the transmitted reference signals, for a number of the controlled phase differences, one or more indications of a selected precoder matrix.

The arrangement further comprises an identifying unit 1305, adapted to identify changes of selected precoder matrix over the controlled number of phase differences, over the set of frequency bands, wherein the identifying is based on the received one or more indications. The arrangement further comprises a determining unit 1306, adapted to determine at least one relation between the identified changes of selected precoder matrix over the number of controlled phase differences and set of frequency bands; and further adapted to determine at least one phase affecting error associated with the transmission from the at least one pair of correlated antennas based on said at least one relation. The arrangement may further comprise an adjusting or calibrating unit 1308, adapted to adjust the transmission from the at least one pair of correlated antennas, such that said at least one phase affecting error is reduced.

Figure 14:
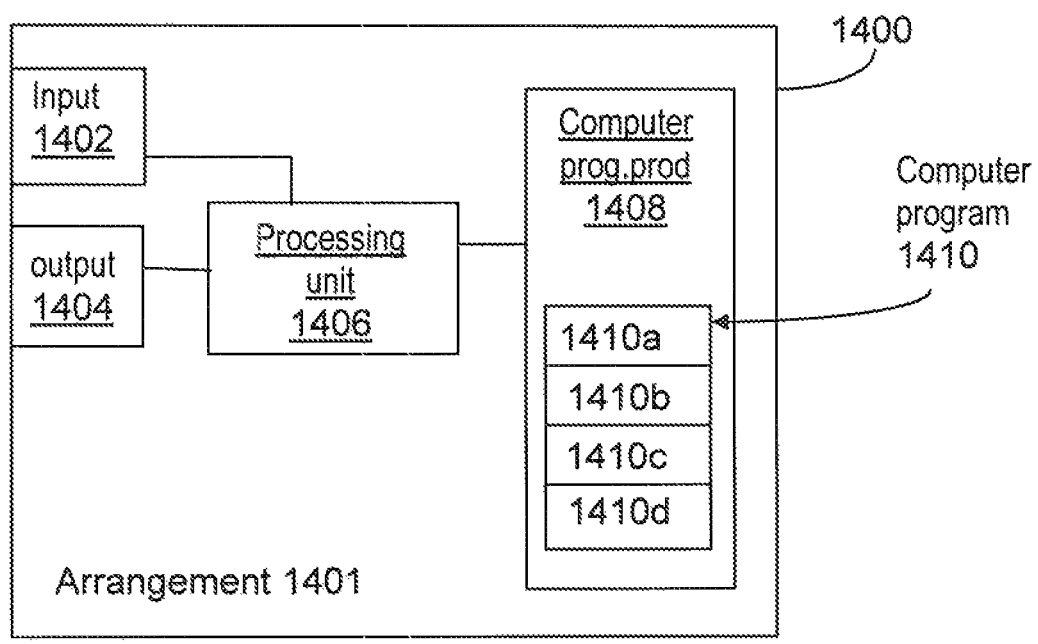

Exemplifying Arrangement, FIG. 14

FIG. 14 schematically shows a possible embodiment of an arrangement 1400, which also can be an alternative way of disclosing an embodiment of the arrangement illustrated in FIG. 13. Comprised in the arrangement 1400 are here a processing unit 1406, e.g. with a DSP (Digital Signal Processor). The processing unit 1406 may be a single unit or a plurality of units to perform different actions of procedures described herein. The arrangement 1400 may also comprise an input unit 1402 for receiving signals from other entities, and an output unit 1404 for providing signal(s) to other entities. The input unit 1402 and the output unit 1404 may be arranged as an integrated entity.

Furthermore, the arrangement 1400 comprises at least one computer program product 1408 in the form of a non-volatile memory, e.g. an EEPROM (Electrically Erasable Programmable Read-Only Memory), a flash memory and a hard drive. The computer program product 1408 comprises a computer program 1410, which comprises code means, which when executed in the processing unit 1406 in the arrangement 1400 causes the arrangement and/or a node in which the arrangement is comprised to perform the actions e.g. of the procedure described earlier in conjunction with FIGS. 10-12.

The computer program 1410 may be configured as a computer program code structured in computer program modules. Hence, in an exemplifying embodiment, the code means in the computer program 1410 of the arrangement 1400 may comprise a control module 1410a for arranging transmission of reference signals from the correlated first and second antennas in the at least one pair, in a set of frequency bands, wherein a number of controlled phase differences are introduced between reference signals transmitted from the first antenna in relation to reference signals transmitted from the second antenna. The arrangement 1400 may further comprise a receiving module 1410b for receiving, in response to the transmitted reference signals one or more indications of a selected precoder matrix;

The computer program may further comprise an identifying module 1410c for identifying changes of selected precoder matrix over the controlled number of phase differences, over the set of frequency bands. The computer program 1410 may further comprise a determining module 1410d for determining at least one relation between the identified changes of selected precoder matrix over the number of controlled phase differences and set of frequency bands; and further adapted to determine at least one phase affecting error associated with the transmission from the at least one pair of correlated antennas based on said at least one relation.

The modules 1410a-d could essentially perform the actions of the flows illustrated in FIGS. 10-12, to emulate the arrangement illustrated in FIG. 13.

Although the code means in the embodiment disclosed above in conjunction with FIG. 14 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

While the method and arrangement for determining at least one phase affecting error related to transmission from at least one pair of correlated antennas as suggested above has been described with reference to specific embodiments provided as examples, the description is generally only intended to illustrate the inventive concept and should not be taken as limiting the scope of the suggested methods and arrangements, which are defined by the appended claims. While described in general terms, the method and arrangement may be applicable e.g. for different types of communication systems, using commonly available communication technologies using correlated antennas, such as e.g. WCDMA, LTE, LTE-A, WiMAX (Worldwide Interoperability for Microwave Access), GSM, UMTS, satellite systems or broadcast technologies.

It is also to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

The invention claimed is:

1. Method in a transmitting node in a wireless communication system for determining at least one phase affecting error related to transmission from at least one pair of correlated antennas comprising a first and a second antenna, the method comprising:
    transmitting reference signals from the correlated first and second antennas in the at least one pair, in a set of frequency bands, wherein a number of controlled phase differences are introduced between reference signals transmitted from the first antenna in relation to reference signals transmitted from the second antenna;
    receiving, from another entity, in response to the transmitted reference signals, for a number of the controlled phase differences, one or more indications of a selected precoder matrix;
    identifying changes of selected precoder matrix over the number of controlled phase differences, over the set of frequency bands, wherein the identifying is based on the received one or more indications;
    determining at least one relation between the identified changes of selected precoder matrix over the number of controlled phase differences and set of frequency bands; and
    determining at least one phase affecting error associated with the transmission from the at least one pair of correlated antennas based on said at least one relation,
    thus enabling adjustment of transmission from the at least one pair of correlated antennas, such that said at least one phase affecting error is reduced.

2. Method according to claim 1, wherein one of the at least one determined relation involves the displacement of the identified changes of selected precoder matrix over the number of controlled phase differences between frequency bands.

3. Method according to claim 1, wherein one of the at least one determined relation is the average displacement in phase difference per frequency band, of the changes of selected precoder matrix.

4. Method according to claim 1, wherein one of the at least one determined relation is the inclination of a line fitted to the identified changes of selected precoder matrix in a controlled phase difference versus frequency band mapping for a pair of correlated antennas.

5. Method according to claim 1, wherein one of the at least one phase affecting errors is a delay error between transmissions from the antennas in the at least one pair of correlated antennas.

6. Method according to claim 1, wherein a/one determined relation is the difference in absolute phase difference, within a frequency band, between the identified changes in selected precoder matrix for two pairs of correlated antennas.

7. Method according to claim 1, wherein one of the at least one phase affecting errors is a phase error difference between transmissions from two pairs of correlated antennas.

8. Method according to claim 1, wherein a set of precoder matrices, from which the precoder matrix is selected, is configured such that precoder matrix selections for different antenna pairs are made independent of each other.

9. Method according to claim 1, further comprising:
    adjusting the transmission from the at least one pair of correlated antennas based on the determined phase affecting error.

10. Arrangement in a transmitting node in a wireless communication system for determining at least one phase affecting error related to transmission from at least one pair of correlated antennas comprising a first and a second antenna, said arrangement comprising:
    a transmitter, adapted to transmit reference signals from the correlated first and second antennas in the at least one pair, in a set of frequency bands, wherein a number of controlled phase differences are introduced between reference signals transmitted from the first antenna in relation to reference signals transmitted from the second antenna;
    a receiver, adapted to receive, from another entity, in response to the transmitted reference signals, for a number of the controlled phase differences, one or more indications of a selected precoder matrix;
    an identifying unit, adapted to identify changes of selected precoder matrix over the controlled number of phase differences, over the set of frequency bands, wherein the identifying is based on the received one or more indications;

a determining unit, adapted to determine at least one relation between the identified changes of selected precoder matrix over the number of controlled phase differences and set of frequency bands; and further adapted to determine at least one phase affecting error associated with the transmission from the at least one pair of correlated antennas based on said at least one relation, thus enabling adjustment of transmission from the at least one pair of correlated antennas, such that said at least one phase affecting error is reduced.

11. Arrangement according to claim 10, wherein the determining unit is adapted to determine a relation in form of the displacement of the identified changes of selected precoder matrix over the number of controlled phase differences between frequency bands.

12. Arrangement according to claim 10, wherein the determining unit is adapted to determine a relation in form of the average displacement in phase difference per frequency band, of the changes of selected precoder matrix.

13. Arrangement according to claim 10, wherein the determining unit is adapted to determine a relation in form of the inclination of a line fitted to the identified changes of selected precoder matrix in a controlled phase difference vs. frequency band mapping for a pair of correlated antennas.

14. Arrangement according to claim 10, wherein the determining unit is adapted to determine a phase affecting error in form of a delay error between transmissions from the antennas in a pair of correlated antennas based on a determined relation for said pair of correlated antennas.

15. Arrangement according to claim 10, wherein the determining unit is adapted to determine a difference in absolute phase difference, within a frequency band, between the identified changes in selected precoder matrix for two pairs of correlated antennas.

16. Arrangement according to claim 10, wherein the determining unit is adapted to determine a phase affecting error in form of a phase error difference between transmissions from two pairs of correlated antennas based on said at least one determined relation.

17. Arrangement according to claim 10, wherein a set of precoder matrices, from which the precoder matrix is selected, is configured such that precoder matrix selections for different antenna pairs are made independent of each other.

18. Arrangement according to claim 10, further comprising an adjusting unit, adapted to adjust the transmission from the at least one pair of correlated antennas based on the determined phase affecting error.

* * * * *